Nov. 4, 1969          LE ROY B. OVERSTREET ET AL          3,475,889
                      HARVESTER FOR NUTS AND THE LIKE
Original Filed Nov. 16, 1966                              5 Sheets-Sheet 1

EUGENE P. BRUMBAUGH
BERTRAND L. BRUMBAUGH
LEROY B. OVERSTREET
BY John R. Walker, III
    Attorney

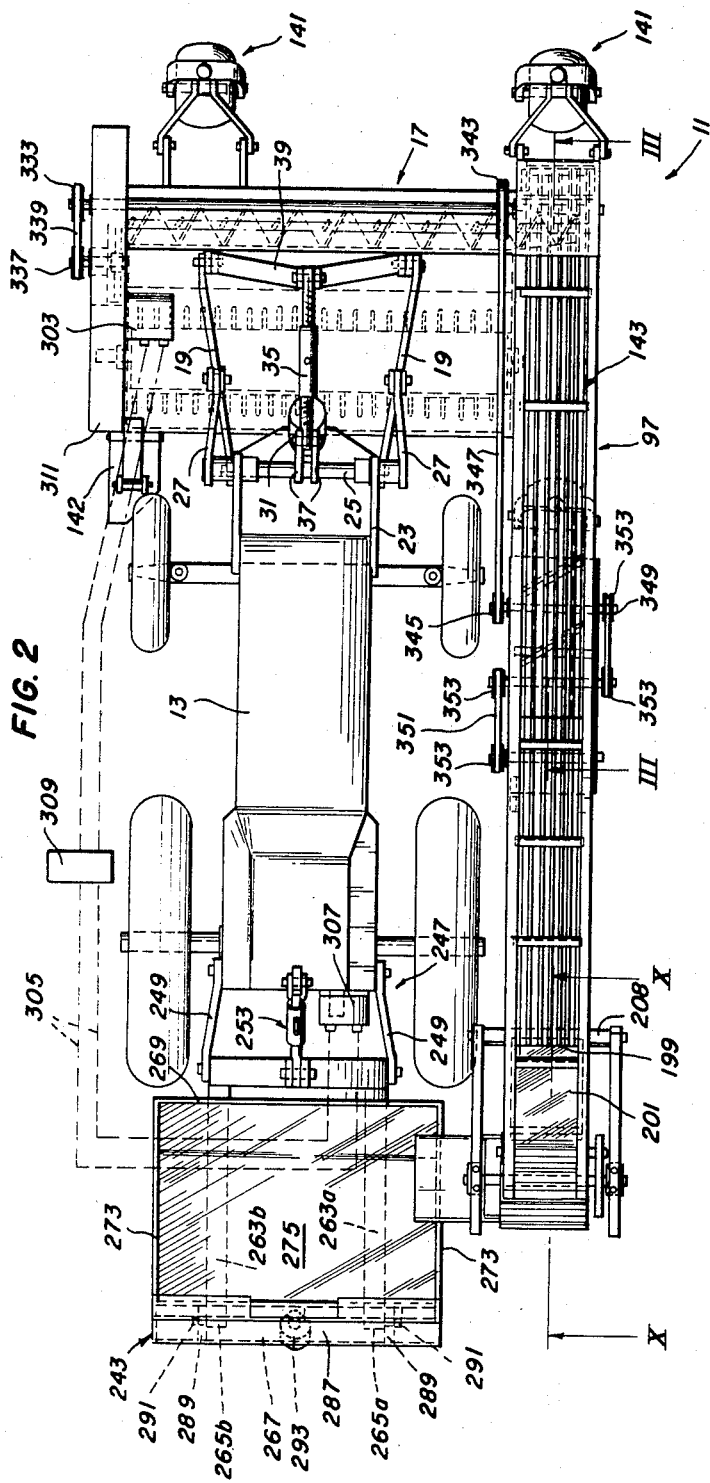

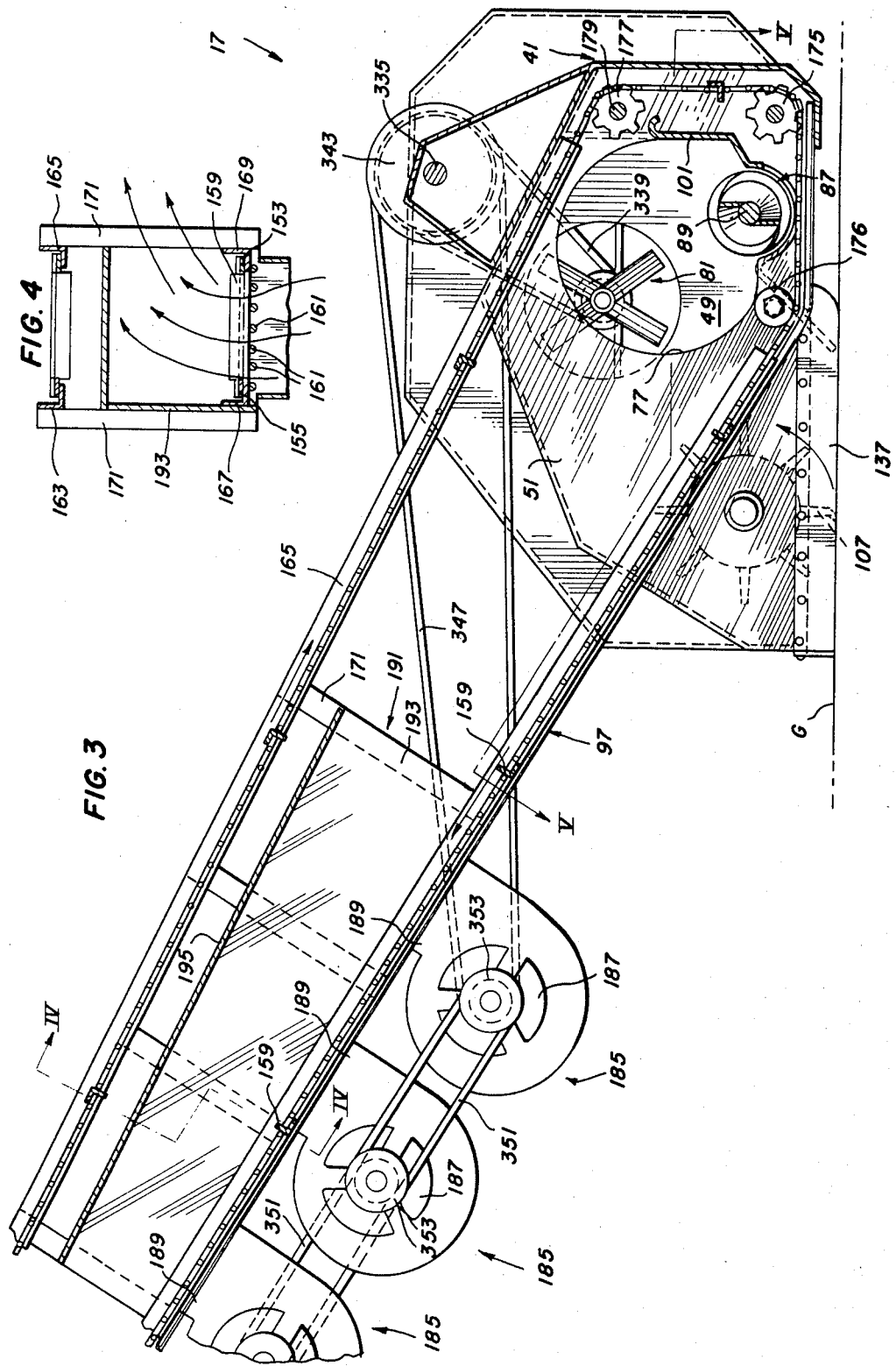

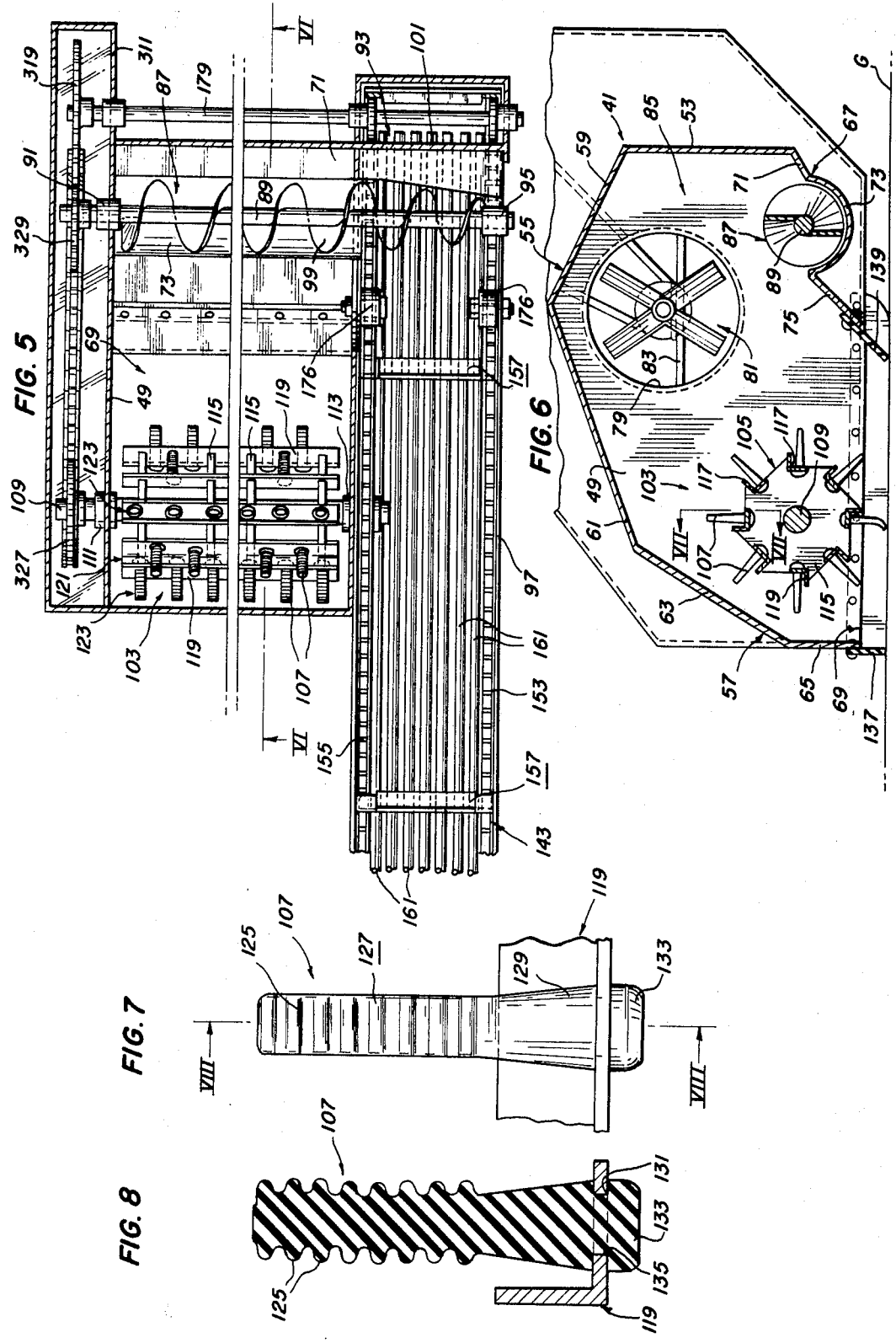

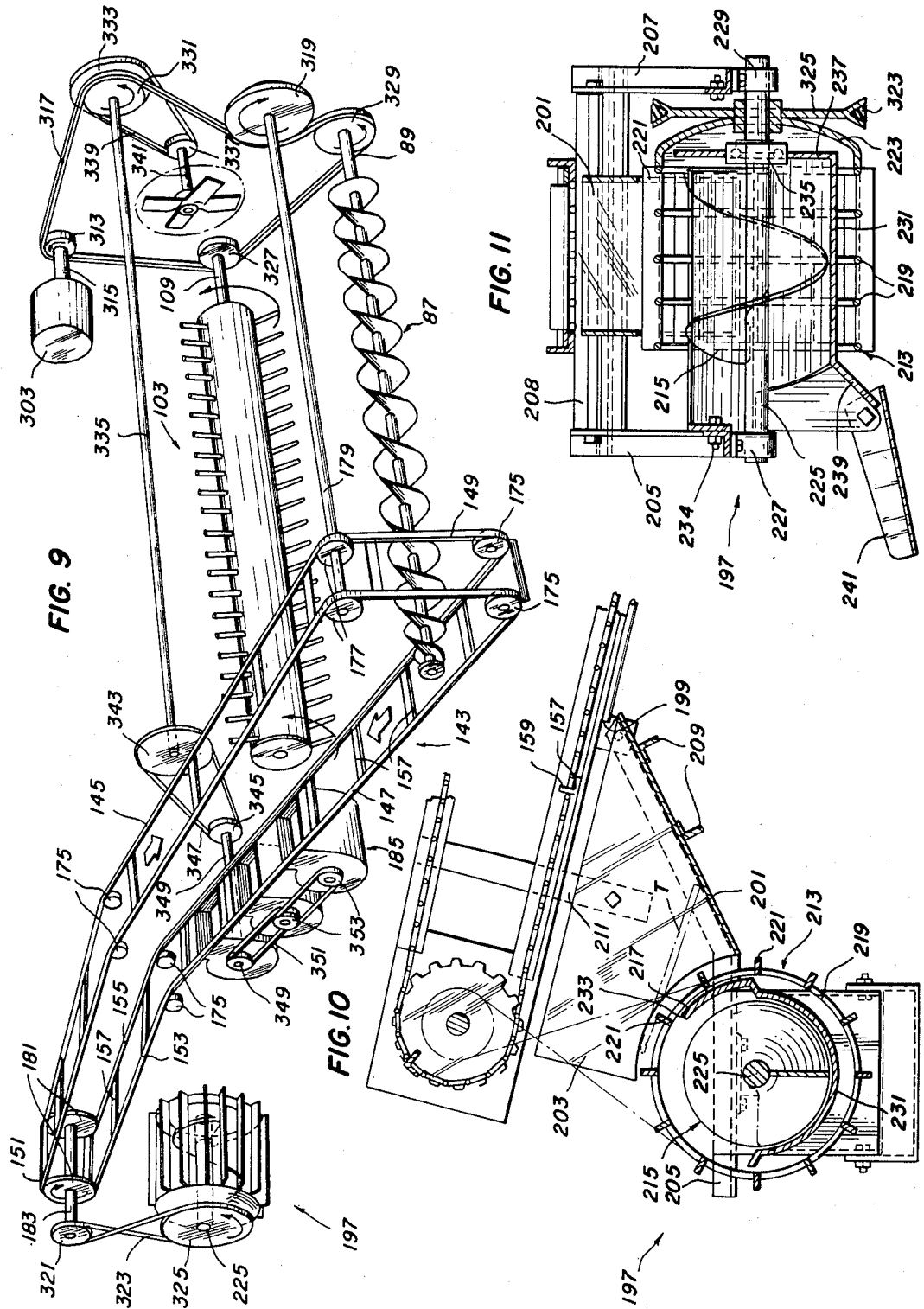

United States Patent Office 3,475,889
Patented Nov. 4, 1969

3,475,889
HARVESTER FOR NUTS AND THE LIKE
Le Roy B. Overstreet, Louisville, Miss., and Eugene P. Brumbaugh, Fort Valley, and Bertrand L. Brumbaugh, Perry, Ga.; said Overstreet assignor, by mesne assignments, to Thomson Machinery Company, Inc., Thibodaux, La., a corporation
Continuation of application Ser. No. 594,880, Nov. 16, 1966. This application Nov. 22, 1968, Ser. No. 778,350
Int. Cl. A01g 19/06
U.S. Cl. 56—328        11 Claims This is a continuation of application Ser. No. 594,880 filed Nov. 16, 1966, now abandoned.

This invention relates to a harvester for picking up nuts and the like from the ground and for separating the unwanted foreign material therefrom, such as leaves, sticks, and the like.

One of the objects of the present invention is to provide a highly efficient harvester for picking up large quantities of nuts and the like from the ground in a short period of time.

A further object is to provide an improved harvester which efficiently separates the foreign material from the nuts and the like.

A further object is to provide an improved harvesting head assembly that includes a housing, a transversely extending auger rotatably mounted in said housing and closely spaced from the ground, deflector means adjacent said auger, and means for flipping the nuts and the like off the ground at a relatively low angle either against said deflector means or the interior of the housing for deflection into the auger or for flipping the nuts and the like directly into the auger.

A further object is to provide such flipping means which comprises a rotatable assembly including a plurality of horizontal and angularly spaced transverse members, and a plurality of ribbed resilient fingers mounted in staggered rows on said transverse members in position to bendably contact the ground and engage the nuts and the like for the flipping thereof.

A further object is to provide an improved arrangement of the nut conveying means that includes a continuous loop conveyor means in which the nuts are carried on the lower flight of the conveyor means adjacent the inner side of the loop.

A further object is to provide such a conveyor means that includes pusher members that push the nuts along a bed of spaced rods that are disposed below the lower flight of the conveyor and through which pass some of the trash from the nuts.

A further object is to provide such a harvester including a plurality of fan means disposed below said bed for blowing air up through the spaces between said rods to blow foreign material away from the nuts.

A further object is to provide unique and efficient means for separating the sticks from the nuts.

A further object is to provide in such a harvester improved container means for collecting and dumping the nuts and which is particularly effective to dump the nuts into trucks, wagons, and the like disposed at a high level above the ground.

A further object is to provide such a harvester that is adapted to be used with a tractor having a three point hitch at the front thereof and a three point hitch at the rear thereof and which harvester can be quickly and easily attached to such a tractor with the harvester head assembly being carried by the front three point hitch, the container means being carried by the rearward three point hitch, and the means for conveying the nuts from the harvester head assembly to the container means being disposed alongside the tractor.

A further object is generally to improve the design and construction of harvesters for nuts and the like.

The means by which the foregoing and other objects of the present invention are accomplished and the manner of their accomplishment will be readily understood from the following specification upon reference to the accompanying drawings, in which:

FIG. 2 is a somewhat schematic top plan view of the harvester and tractor of FIG. 1.

FIG. 3 is an enlarged sectional view taken as on the line III—III of FIG. 2.

FIG. 4 is a sectional view taken as on the line IV—IV of FIG. 3.

FIG. 5 is a sectional view taken as on the line V—V of FIG. 3.

FIG. 6 is a sectional view taken as on the line VI—VI of FIG. 5.

FIG. 7 is an enlarged fragmentary view taken as on the line VIII—VIII of FIG. 6.

FIG. 8 is a sectional view taken as on the line VIII—VIII of FIG. 7.

FIG. 9 is a diagrammatic view showing the drive means of the present invention and its relationship to various other parts of the present invention.

FIG. 10 is an enlarged sectional view taken as on the line X—X of FIG. 2.

FIG. 11 is a sectional view taken as on the line XI—XI of FIG. 1.

Figure 1:
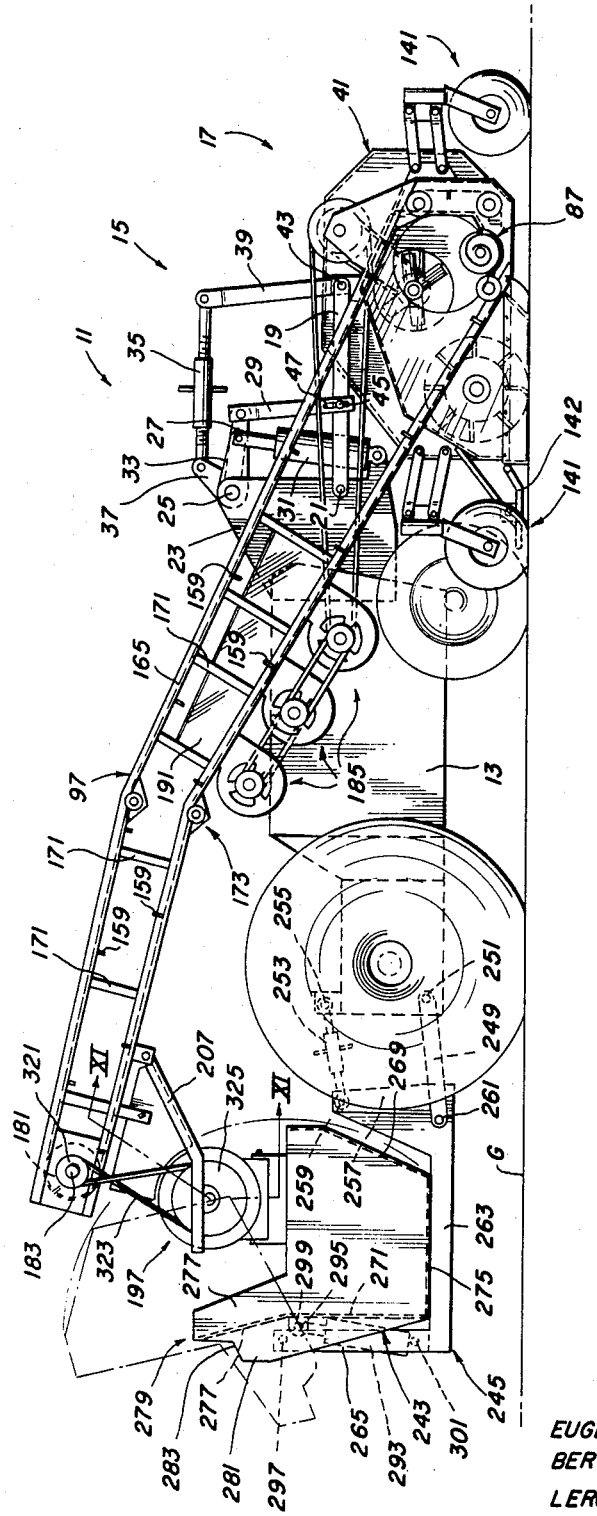
FIG. 1 is a somewhat schematic side elevational view of the harvester of the present invention shown mounted on a tractor and showing in broken lines a dump position of the container.

Referring now to the drawings in which the various parts are indicated by numerals, the harvester 11 of the present invention is shown in the drawings in conjunction with a tractor 13 of usual construction and which includes a front three point hitch 15 that is removably connected to the harvester head assembly 17 of harvester 11. Three point hitch 15 includes the usual lift arms 19 pivotally attached as at 21 from suitable support structure 23 for upward and downward pivoting movement relative thereto. Support structure 23 in turn is fixedly attached to the front of tractor 13. Rotatably mounted from support structure 23 is the usual transverse shaft 25 which has the usual lever arms 27 fixedly attached to the opposite ends thereof and which lever arms are pivotally connected to the links 29 that in turn are pivotally connected adjacent the lower ends thereof respectively to lift arms 19. The usual piston-cylinder assembly 31 which is connected by the usual hydraulic lines, valves, etc., to the hydraulic system of tractor 13, is pivotally attached adjacent the lower end thereof to support structure 23 and is pivotally attached at the upper end thereof to a lever 33 which in turn is fixedly attached to the shaft 25. The usual adjustable spacer link 35 is provided and is pivotally connected at one end to levers 37 which in turn are fixedly attached to shaft 25. The opposite end of link 35 is pivotally attached to an upstanding yoke 39 which in turn is fixedly attached to the housing 41 of harvester head assembly 17. Yoke 39 is preferably securely braced relative to housing 41 as by suitable brace rods, not shown. The forward ends of lift arm 19 are also pivotally connected to yoke 39 adjacent the lower end thereof as at 43.

From the foregoing, it will be understood that actuation of piston-cylinder assembly 31 to extend the piston-cylinder assembly will cause lifting of harvester head assembly 17, along with the other structure attached thereto as will be better understood in the description to follow later in the specification, so that the harvester head assembly is lifted from the ground as when it is desired to transport the harvester 11 from place to place. Also, it will be understood that when the piston-cylinder assembly 31 is retracted, the harvester head assembly 17 will be lowered so that it will be rollingly supported from the ground as will be better understood in the description to follow later in the specification. Also, it will be understood that the harvester head assembly 17 is "floatingly" supported from the ground so that it can move upwardly and downwardly with variations in the ground due to the fact that the connection between lift arms 19 and links 29 is a lost motion connection, that is, there is a pin 45 on each of the lift arms 19 which extends through a slot 47 in each of the links 29.

Referring now in more detail to harvester head 17, it comprises the previously mentioned housing 41 that includes opposite side walls 49, 51 interconnected by front, top, and back walls 53, 55, 57 respectively. The top and back walls are preferably respectively formed of two panels angled relative to each other. Thus, top wall 55 preferably includes a forward panel 59 and a rearward panel 61 angled downwardly relative to forward panel 59. Likewise, back wall 57 preferably comprises an angled panel 63 and a vertical panel 65. The bottom wall 67 of housing 41 extends only across the front part of the housing leaving an opening 69 in the bottom of housing 41. Bottom wall 67 angles downwardly from the lower edge of front wall 53 to establish a ramp portion 71, then is arcuately formed to establish a trough portion 73, and thence angles downwardly to establish a deflector portion 75.

Side wall 51 is provided with an exit opening 77 adjacent the front lower part thereof, and side wall 49 is provided with a fan opening 79 substantially opposite opening 77, but slightly upwardly and rearwardly relative thereto. A fan 81 is mounted in opening 79 by suitable means as the support 83 fixedly attached to side wall 49. The fan 81 is arranged to blow air across the open space 85 in housing 41 towards exit opening 77, for a purpose later to be described. Harvester head assembly 17 includes first conveyor means in the form of an auger 87 that includes a shaft 89 extending transversely of housing 41 and rotatably supported adjacent one end thereof as by a bearing 91 in side wall 49. Auger 87 extends outwardly of housing 41 through opening 77 and across a bed 93 where the end thereof is rotatably supported as by a bearing 95 attached to a frame 97. The flights 99 of auger 87 become smaller as they extend across bed 93, as will be best seen in FIG. 5. The auger 87 as will be best seen in FIGS. 1, 3 and 6 is closely spaced from the ground G, which is an important factor in the present invention as will be more fully apparent later in the specification. Trough 73 encircles the lower part of auger 87 which is in housing 41 but the trough terminates at the side wall 51 so that the nuts and the like can be moved onto the bed 93. A portion of front wall 53 as at 101 and the ramp portion 71 extend across the bed 93 adjacent the auger 87.

Harvester head assembly 17 additionally includes flipping means for flipping the nuts off of the ground, which is in the form of a flipping assembly 103 rotatably mounted in housing 41 in the rearward part thereof adjacent opening 69. Flipping assembly 103 includes a wheel-like member 105 and a plurality of flipping fingers 107 mounted thereon. Wheel-like member 105 includes a transverse shaft 109 parallel to shaft 89 and rotatably mounted adjacent the ends thereof as by a bearing 111 supported by side wall 49 and a bearing 113 supported by side wall 51. Wheel-like member 105 includes a plurality of vertical hub plate members 115 fixedly mounted on a shaft 109. Each of hub plate members 115 preferably includes a plurality of angular step portions 117, as best seen in FIG. 6. Also, wheel-like member 105 includes a plurality of horizontally extending and angularly spaced parallel members 119, which are preferably angle members, disposed around the periphery of the wheel-like member and fixedly attached to the hub plate members 115 at the step portions 117, as best seen in FIG. 6.

Fingers 107 are mounted in staggered rows on members 119 and extend radially outwardly relative to the wheel-like member 105 in position to contact the ground through opening 69 and flip the nuts in a manner later to be described. The above-mentioned staggered relationship is best seen in FIG. 5 wherein it will be seen the row 121 of flipping fingers 107 on one of the members 119, which fingers are spaced transversely across the member, are staggered relative to the adjacent rows 123 of the fingers on either side thereof. Fingers 107 are substantially alike, and the following description of one and its mounting means will suffice for all. Each finger 107 is formed of a suitable resilient material as rubber or the like, and is preferably provided with a plurality of transverse ribs 125 on the active nut-engaging portion 127 thereof. The base 129 of the finger is integrally formed with the nut-engaging portion 127 and is preferably provided with a notch 131 therearound, which provides the mounting means. Thus, to mount the finger, the end 133 thereof is forceably inserted in an aperture 135 provided in member 119 until the portions of the member adjacent aperture 135 are received in notch 131, as best seen in FIGS. 7 and 8.

A flexible skirt 137 is attached to the lower edge of panel 65 and walls 49, 51 adjacnet opening 69, and another flexible skirt 139 is attached to the lower edge of deflector portion 75 and angles rearwardly and downwardly in parallel relationship with the deflector portion. Skirts 137, 139 thus surround opening 69 and drag the ground whereby harvester head assembly 17 is substantially air tight with the ground so that a more effective use of the air from fan 81 is obtained. It will be understood that the nuts will cause the skirt 139 to bend slightly upwardly and will pass thereunder into the portion below flipping assembly 103 to be acted thereon as the harvester head assembly 17 is moved forwardly over the ground by the tractor 13. Flipping assembly 103 is driven counterclockwise as viewed in FIG. 6 and at a speed such that the ground contacting fingers are moving at a faster speed than the speed of harvester head assembly 17. The nuts and the like on the ground adjacent opening 69 will be engaged by the fingers 107 which will cause the nuts to be flipped at a relatively low angle forwardly across the space 85 where a large part of the trash will be blown from the nuts while they are in the air and which trash will pass outwardly through the exit opening 77. Some of the nuts will hit against the front wall 53 and fall onto ramp portion 71 and thence roll into the auger 87. Other nuts will hit against deflector 75 and thence go into the auger or be deflected against the front wall 53 and then roll into the auger, and some of the other nuts will go directly into the auger. The auger 87 is rotated in such a direction that the nuts will be carried laterally in trough 73 and on out through opening 77 where they are deposited on bed 93. Due to this unique combination of the flipping means and the auger 87 which is close to the ground, an efficient picking up of the nuts is accomplished. This is so since substantially all of the nuts will end up in auger 87 regardless of the angle at which they are flipped, and the small number that miss will roll down deflector 75 and will again be engaged by the flipping fingers 107. Due to the staggered fingers and the speed of rotation thereof, it is substantially impossible for the nuts to get by the flipping means without being engaged by the flipping fingers 107. The importance of the low lying auger of the present invention can be realized when it is considered that if the auger were spaced a considerable distance above the ground, instead of the close spacing as in the present invention, those nuts that would be flipped at a low angle would not go into the auger but would roll back down for subsequent engagement by the flipping fingers, which would decrease the capacity of the harvester. In other words, the percentage of nuts missing the auger on the first try would be increased, which would cause an increased burden on the flipping fingers and therefore a decrease in the overall capacity of the harvester.

A plurality of wheel assemblies 141, of suitable construction, which are preferably of the caster type, are provided in harvester 11, and are preferably attached in the following locations: one to harvester head assembly 17 adjacent the left side thereof, one to frame 97 at the forward part thereof, and another to harvester head assembly 17 at the right rearward part thereof. These wheel assemblies 141, it will be understood, support the harvester head assembly 17 when in an in-use harvesting position, on the ground, as best seen in FIG. 1. An adjustable slide 142 is preferably mounted on the rearward left corner of harvester head assembly 17.

A second conveyor means carries the nuts upwardly and rearwardly from the discharge of auger 87 and said second conveyor means comprises in addition to bed 93 a continuous conveyor assembly 143, which is disposed for travel in a continuous loop including an upper flight 145, a lower flight 147, a first end 149 and a second end 151, as best seen in FIG. 9. Conveyor assembly 143 includes a pair of continuous elongated conveyor chain portions 153, 155 and a plurality of parallel spaced pusher members 157 attached to conveyor chain portions 153, 155 at the opposite ends of the pusher members. The pusher members 157 are preferably in the form of angle members and include portions 159 thereof substantially perpendicular to the direction of travel of conveyor assembly 143 and extending inwardly of the conveyor assembly loop. In other words, the portions 159 on the lower flight 147 extend upwardly, and the portions 159 on the upper flight 145 extend downwardly, as best seen in FIG. 1. The conveyor assembly 143 is driven clockwise as viewed in FIGS. 1, 3 and 9. Thus, the lower flight 147 moves to the left and upwardly as viewed in these figures so that the portions 159 of the pusher members 157 push the nuts and the like slidably upwardly along the bed 93. Bed 93 includes a plurality of rods 161 that are supported from frame 97 in parallel spaced relationship to each other below the lower flight 147 and extend in the same general direction as the travel of lower flight 147. The rods 161 are laterally spaced apart a distance less than the width of the nuts to be harvested so that the nuts will not pass through the spaces between the rods, but on the other hand some of the trash will fall through the bed 93.

Frame 97 furnishes the primary support for conveyor assembly 143 and is of a suitable configuration and construction to support the conveyor assembly in the heretofore-described loop configuration. Thus, frame 97 includes longitudinal upper members 163, 165 which respectively serve as track means for the upper flight 145 of the conveyor assembly, and a pair of laterally spaced longitudinal lower members 167, 169 which respectively serve as track means for the lower flight 147 of conveyor assembly 143. In addition, frame 97 includes upstanding members 171 rigidly connected to and interposed between members 163 and 167, and between members 165 and 169. Frame 97 includes other suitable members not shown to brace and rigidify the frame. As will best be seen in FIGS. 1 and 2, the frame 97 is fixedly attached to the right side of head assembly 17 from where it extends upwardly and rearwardly alongside the tractor 13 to an area 173 which is past the middle of the frame from whence it extends rearwardly at a slightly smaller angle. It should be pointed out that the frame 97 is rigid throughout its entire length including the area 173. Also, it should be pointed out that the first or forward end 149 of conveyor assembly 143 encircles the outward end of auger 87 and the nuts are carried up on the inside of the loop on the lower flight, as opposed to the usual type of conveyor in which the material is carried on the outside of the upper flight. By this unique arrangement of applicants' invention, it is possible for the auger 87 to be close to the ground, so as to provide the benefits heretofore mentioned. It will be understood that if the nuts were carried on the upper flight on the outside of the loop, it would be necessary for the auger to be on top of the upper flight and therefore would have to be spaced at a considerable distance above the ground whereby the excellent efficiency of the present invention would not be possible. Suitable idler sprockets 175 are rotatably mounted from frame 97 and respectively engage conveyor chains 153, 155. Also, a pair of idler rollers 176 engage conveyor chains 153, 155. In addition, drive sprockets 177 respectively engage conveyor chains 153, 155 and are fixedly mounted on a drive shaft 179 which in turn is rotatably mounted by suitable bearings, not shown, from harvester head assembly 17 and extends transversely thereacross to be rotatably driven in a manner later to be described. Also, adjacent the rearward end of conveyor assembly 143 the conveyor chains 153, 155 engage sprockets 181 which are fixedly mounted on a shaft 183 to drive mechanisms later to be described. A plurality of fan means or units 185, which are preferably though not necessarily three in number, as shown in the drawings, are mounted on frame 97 in spaced relationship along the length of lower flight 147 to blow air upwardly through bed 93 so that additional foreign material is blown away from the nuts and the like as they are carried rearwardly and upwardly by conveyor assembly 143. The units 185 are preferably disposed below frame 97 as best seen in FIGS. 1 and 3 and are of the well-known type which include inlet openings 187 for the air to enter and which is blown upwardly through the cowling 189. The air after being blown upwardly through the cowling 189 and bed 93 is preferably directed laterally of harvester 11 to the right side thereof as by means of the housing 191 which has an upstanding side 193, a top 195, and is open on the side opposite side 193 so that the air can be directed outwardly, as best seen in FIG. 4.

After the nuts have been carried upwardly on lower flight 147 past the fan units 185 into the rearward part of the conveyor assembly, most of the foreign material has been removed from the nuts with the exception of the longer sticks, which are separated from the nuts by the stick separator 197 of the present invention which will be described hereinbelow.

Bed 93 terminates as at 199 adjacent the rearward end of frame 97 and second end 151. A first chute 201 is attached to frame 97 and extends downwardly and rearwardly from the bed termination 199 so that as the nuts and long sticks are carried off the end of bed 93, they slide together down chute 201 towards stick separator 197. Chute 201 is preferably provided with sides 203 to keep the nuts on the chute. Suitable supporting structure is provided for not only supporting the chute 201 from frame 97 but also to support the stick separator 197. This supporting structure preferably includes a pair of support arms 205, 207 which are fixedly attached to frame 97 adjacent the upper ends thereof by a transverse member 208 and extend downwardly therefrom. Also, the support structure includes a pair of transverse angle members 209 extending between the support arms 205, 207, and a depending member 211 fixedly attached to the frame 97 and sides 203.

Stick separator 197 comprises in general a cage 213 rotatably mounted for rotation about a horizontal axis, a third conveyor means or auger 215 inside of cage 213 rotatable with the cage about the same horizontal axis in concentric relationship therewith, and a relatively stationary shield disposed between the auger 215 and the cage 213. Cage 213 comprises a plurality of spaced side by side rings 219 rigidly interconnected by a plurality of angularly spaced transverse paddle members 221 that are provided around the periphery of cage 213 and the planes of which extend radially relative to the cage and outwardly from ring 219. At one end (the right end) the cage 213 is closed by means of an end member 223 that supports the rings 219 and paddle members 221 with the end member being fixedly attached to the end one of ring 219 and to the ends of the paddle members 221, as best seen in FIG. 11. The end member 223 is fixedly mounted on shaft 225 that extends axially of the cage 213. The opposite end of cage 213 from end member 223 is open. Shaft 225 is rotatably supported at the opposite ends thereof from support arms 205, 207 as by means of the bearings 227, 229. A stationary trough 231 is supported inside of cage 213 below auger 215 and preferably is formed integrally with the lower end of shield 217, at a place opposite the lower end of chute 201 from where the shield extends upwardly for a distance around auger 215 in spaced relationship thereto and terminates at the edge 233. Trough 231 and shield 217 are supported adjacent one end from support arm 205 as by the nut bolt assembly 234 and are supported adjacent the opposite end by the bearings 235 which is turnably mounted on the shaft 225. It will be noted that the trough 231 is provided with the end 237 which is the actual portion of the trough connected to the bearing 235. Also, it will be noted that the auger 215 is fixedly mounted on shaft 225 so that the auger and cage 213 turn together with the stationary shield 217 and through 231 being disposed therebetween. In addition, it will be noted that this is a unique arrangement in that the function of bearing 235 is to support stationary parts from the turnable shaft 225, which is just the opposite from the normal function of a bearing to support a turnable shaft from a fixed structure. Trough 231 is open at the left end or end opposite end from end 237 and is sloped downwardly for a portion as at 239.

The operation of the stick separator is as follows: The sticks T and the nuts sliding down chute 201 as heretofore described will contact shield 217 when they reach the bottom of the chute. The sticks will slide down the chute 201 with one of the ends thereof first so that the end of the stick will strike the shield 217 and be prevented from passing through to the auger 215. As the cage 213 turns, which turning movement will be counterclockwise as viewed in FIGS. 9 and 10, the paddle members 221 will cause the sticks to assume a somewhat tangential relationship relative to cage 213 and be carried thereby over the top of the cake and deposited onto the ground on the other side of the cage. However, the nuts will pass through the spaces between the paddle members 221 and between rings 219 into the auger 215 after they have been pushed past the edge 233 of the shield. Then, they will drop down into trough 231 and be moved laterally to the left as viewed in FIG. 11 by auger 215 which will push them on out and down the sloped portion 239. Adjacent the lower edge of sloped portion 239 is pivotally attached to slope portion 239 a second chute 241 for discharging the nuts into an upwardly opening box-like container 243 carried rearwardly of the tractor 13 by the following means:

A cradle-like frame 245 is movably supported for upward and downward movement by the usual rearward three point hitch 247 provided on tractor 13. Three point hitch 247 is preferably similar to the front three point hitch 15 and thus includes lift arms 249 that are pivotally attached to the rearward part of the tractor as at 251 and adapted to be swung upwardly and downwardly by means of a piston-cylinder assembly and links, not shown, in the usual manner and controlled by the usual controls, not shown, on tractor 13. The usual adjustable spacer link 253 is provided which is pivotally connected to tractor 13 at the forward end of the link as at 255. The rearward end of spacer link 253 as at 259 is detachably and pivotally connected to an upstanding front portion 257 of frame 245 and the rearward ends of lift arms 249 are pivotally connected to frame 245 on the opposite sides thereof as at 261. Frame 245 extends horizontally rearwardly for a portion as at 263 and thence is provided with an upstanding rearward portion 265. In other words, front and rearward portions 257, 265 are spaced apart and are rigidly interconnected by horizontal portion 263. In actual construction, rearward portion 265 is preferably in the form of two laterally spaced upstanding parts 265a and 265b with a transverse member 267 rigidly interconnecting the parts 265a and 265b adjacent the lower ends thereof. Also, horizontal portion 263 is preferably in the form of two laterally spaced members or parts 263a and 263b which are fixedly connected adjacent the rearward ends thereof to parts 265a and 265b and transverse member 267. Additionally, front portion 257 is preferably in the form of a yoke-like member similar to yoke 39 at the front of the tractor. Container 243 is preferably provided with a front wall 269, a rearward wall 271 spaced rearwardly of front wall 269, a pair of side walls 273, rigidly interconnecting the walls 269, 271 adjacent the edges thereof, and a bottom 275 rigidly connected adjacent the lower edges of the walls 269, 271 and 273. Side walls 273 adjacent the rearward parts thereof extend upwardly for a portion as at 277 above the main height of the sides, and rearward wall 271 extends upwardly for the same distance so that a funnel-like portion 279 of container 243 is provided for use in dumping the nuts. Also, sides 273 extend rearwardly of rearward wall 271 for a portion as at 281 and steps 283 are formed at the upper portion of rearward portion 271. A plate 287 spans the space between side walls 273 at steps 283.

Container 243 when in a normal loading position, as shown in solid lines in FIG. 1, has the bottom 275 thereof resting on the horizontal portion 263 of cradle 245. Container 243 is pivotally mounted adjacent the upper rearward portion thereof for pivot about a horizontal axis so that it can pivot into a dumping position shown in broken lines in FIG. 1. This pivotal connection is by any suitable means, as for example, the lugs 289 fixedly attached to container 243 and the pins 291 which extend through aligned apertures in the lugs and the upper end of parts 265a, 265b. A piston-cylinder assembly 293 which is connected by the usual hydraulic lines, valves, etc., not shown, to the hydraulic system of the tractor, is interposed between cradle 245 and container 243. The point 295 of pivotal attachment of piston-cylinder assembly 293 to the container 243 is closely spaced from the pivot axis 297 of the container. This point 295 is preferably slightly forwardly and downwardly of the pivot axis 297 and is by any suitable means as the pin-lug connection 299. The lower end of piston-cylinder assembly 293 is pivotally connected as at 301 to the transverse member 267 so that extension of the piston-cylinder assembly 293 is effective to cause movement of the container into the heretofore mentioned dumping position.

From the foregoing it will be understood that the container 243 can be dumped into high level truck beds, wagon beds, and the like by raising the three point hitch 247 as heretofore described and actuating the piston-cylinder assembly 293. The high pivot point 297 of the container 243 gives additional dumping height.

The mechanisms of harvester 11 are preferably driven in the following manner: A hydraulic motor 303 is provided on harvester head assembly 17 and is connected by suitable hydraulic lines indicated diagrammatically as at 305 to a suitable hydraulic pump 307 driven in a well-known manner from the power takeoff of tractor 13. In addition, suitable control means shown diagrammatically as at 309 are interposed in lines 305 and carried by tractor 13 for controlling motor 303. Harvester head assembly 17 includes a gear housing 311 fixedly mounted on the left side of housing 41. In housing 311, a sprocket 313 is fixedly mounted on the shaft 315 of motor 303 and engages a continuous chain 317. Sprocket 313 is driven counterclockwise, as viewed in FIG. 9 to also drive the chain 317 counterclockwise as view in this figure. In addition, in gear housing 311 is a sprocket 319 which is fixedly mounted on shaft 179. Sprocket 319 engages chain 317 in such a manner that it is driven clockwise as viewed in FIG. 9 to rotate the shaft 179 clockwise and drive conveyor assembly 143 clockwise as view in this figure. This also turns sprockets 181 and drives shaft 183 clockwise which rotates a pulley 321 that is fixed to shaft 183. Pulley 321 is connected by a crossed belt 323 to a pulley 325 fixedly mounted on shaft 225. This in turn drives cage 213 and auger 215 in a counterclockwise direction as viewed in FIG. 9. Another sprocket 327 is provided in gear housing 311. Sprocket 327 is fixedly mounted on shaft 109 and engages chain 317 to drive flipping assembly 103 counterclockwise as viewed in FIG. 9. Still another sprocket 329 is provided in gear housing 311. Sprocket 329 is fixedly mounted on shaft 89 and engages chain 317 to drive auger 87 counterclockwise as viewed in FIG. 9. A double sprocket including a smaller sprocket portion 331 and a larger pulley portion 333 is mounted in gear housing 311. Sprocket portion 331 and pulley portion 333 are fixedly mounted on one end of a transverse shaft 335 which in turn is rotatably mounted on housing 41 by suitable means. The sprocket portion 331 engages the continuous chain 317 to rotate sprocket 331, pulley portion 333 and shaft 335 counterclockwise as viewed in FIG. 9. Pulley portion 333 is connected to a pulley 337 by means of a continuous belt 339. Pulley portion 333, belt 339 and pulley 337 are preferably, though not necessarily, on the outside of gear housing 311. Pulley 337 is fixedly mounted on the shaft 341 of fan 81 to drive the fan counterclockwise as viewed in FIG. 9. At the opposite end of shaft 335 from pulley portion 333 is provided a pulley 343 fixedly attached to the shaft 335. Pulley 343 is connected to a pulley 345 by a continuous belt 347. Pulley 345 is fixedly mounted on shaft 349 of one of the fan units 185 which in turn drives the other fan units as by means of the continuous belts 351 and pulleys 353.

From the foregoing specification, it will be understood that a very effective and efficient harvester is provided for picking up nuts and the like from the ground and for effectively separating the unwanted trash from the nuts, transporting the nuts to a container, which then can be unloaded easily and quickly to a truck bed or the like. In addition, it will be understood that such a harvester is provided that can be quickly and easily attached to and detached from a tractor and which derives all of its power from the tractor.

Although the invention has been described and illustrated with respect to a preferred embodiment thereof, it is to be understood that it is not to be so limited since changes and modifications may be made therein which are within the full intended scope of this invention as hereinafter claimed.

We claim:

1. A harvester for harvesting nuts and the like comprising a harvesting head assembly adapted to be moved over the ground, said harvesting head assembly including a housing having an open space therethrough, first conveyor means in said housing for receiving nuts and the like and for moving the nuts and the like laterally, and means for flipping the nuts and the like from the ground through said open space and to places in said housing from where the nuts and the like are adapted to move into said first conveyor means, fan means in said housing for blowing foreign material from the nuts and the like when traveling through said open space; second conveyor means including a continuous conveyor assembly, means movably supporting said continuous conveyor assembly for travel in a continuous loop including an upper flight, a lower flight, a first end, and a second end; said continuous conveyor assembly including a pair of continuous elongated conveyor portions, a plurality of spaced pusher members attached to said conveyor portions adjacent opposite ends of said pusher members and including portions thereof substantially perpendicular to the travel of said conveyor assembly and extending inwardly of said loop, said second conveyor means including a bed disposed beneath said lower flight of said continuous conveyor assembly extending from adjacent said first end towards said second end and including a plurality of rods spaced apart a distance less than the width of the nuts and the like to be harvested upon which the nuts and the like are adapted to be slidably supported, said first conveyor means extending into said loop adjacent said first end for depositing nuts and the like onto said bed adjacent said first end, means for driving said second conveyor means to cause said pusher members to move along said bed from adjacent said first end towards said second end for pushing nuts and the like along said bed towards said second end for discharge adjacent said second end, fan means beneath said bed for blowing air upwardly through the spaces between said rods to cause additional foreign material to be separated from the nuts and the like, said bed terminating in an end adjacent said second end of said continuous loop, a first chute adjacent said end of said bed for slidably receiving the nuts and the like and any sticks remaining with the nuts and the like after moving over said bed, and a stick separator unit adjacent the lower end of said chute for receiving the nuts and the like and the remaining sticks and for separating the remaining sticks from the nuts and the like.

2. The harvester of claim 1 in which said stick separator unit comprises a cage including a plurality of spaced paddle members between which said nuts are adapted to drop, a relatively stationary shield means inside of said cage for blocking the nuts and sticks from dropping therethrough, means rotatably driving said cage for causing said sticks to be angled and carried over said cage by said paddles, said shield extending upwardly for a distance where it terminates to permit the nuts to drop through said cage while the sticks are carried over said cage, and third conveyor means including at least a portion inside of said cage for conveying the nuts out of said stick separator unit.

3. The harvester of claim 1 in which said means for flipping the nuts and the like includes a rotatable assembly including a plurality of horizontally extending and angularly spaced transverse members, and a plurality of resilient finger elements mounted in rows on said transverse members in position to contact the ground for flipping the nuts and the like, each of said finger elements including a plurality of transverse ribs spaced therealong.

4. The harvester of claim 2 in which is included container means for receiving the nuts and the like from said third conveyor means, support means for pivotally supporting said container from a three point hitch on the rear of a tractor whereby said container is adapted to be raised by said three point hitch, said container being pivotable between an in-use position for receiving the nuts and the like and a tilted dumping position, and piston-cylinder means interposed between said support means and said container means for moving said container means between said in-use and said dumping positions.

5. In combination, a tractor including a front three point hitch means mounted on the front of said tractor and a rear three point hitch means mounted on the rear of said tractor, and hydraulic pump means mounted on said tractor, a portable harvester for nuts and the like including a harvester head means for picking up nuts and the like from the ground, said harvester head means being removably carried in front of said tractor by said front hitch means for movement into and out of engagement with the ground, container means for containing nuts and the like, said container means being removably and pivotally carried rearwardly of said tractor by said rear hitch means for movement between lowered and raised positions, means connected to said container means for the pivot thereof to dump nuts and the like therefrom, conveyor means interposed between said harvester head means and said container means for transporting nuts and the like from said head means to said container means, means along said conveyor means for separating foreign material from said nuts and the like while being conveyed, motor means mounted on said harvester, means coupling said pump means to said motor means for the drive of said motor means, and drive means responsive to said motor means coupled to said harvester head, to said conveyor means and to said means for separating the foreign material for the drive thereof.

6. A harvester for harvesting nuts and the like comprising a harvesting head assembly adapted to be mounted on the front of a tractor for movement over the ground; said harvesting head assembly including opposite side walls, and front, top and back walls interconnecting said side walls; one of said walls being provided with a fan opening and the other of said walls being provided with an exit opening, said housing being provided with an opening at the bottom thereof, auger means rotatably mounted in said housing transversely thereof forwardly of said opening and closely spaced from the ground with an end thereof extending out through said exit, flexible skirt means attached to said housing around said opening in position to drag the ground, a rotatable wheel-like member rotatably mounted in said housing adjacent said opening, deflector means mounted from said housing adjacent said auger, a plurality of finger elements mounted on said wheel-like member and extending radially outwardly from said wheel-like member in position to contact the ground through said opening as said wheel-like member is rotated and to flip the nuts and the like across the space in said housing between said fan opening and said exit opening and are mounted to permit the nuts and the like to either deflect off of said deflector means or the interior of said housing into said auger or to go directly into said auger for movement thereby out said exit opening to a place of discharge, and fan means in said fan opening for blowing across said space towards said exit opening to blow excess foreign material from said nuts and the like out through said exit opening, stick separator means for separating the sticks from the nuts and the like, and conveyor means interposed between said place of discharge and said stick separator means for conveying the nuts and the like and the sticks to said stick separator means.

7. The harvester of claim 6 in which is included elongated open frame means having a forward and a rearward end, said frame means being fixedly attached to said housing adjacent said exit opening and adapted to extend along the side of a tractor supporting said harvester head assembly with said rearward end being disposed adjacent the rearward end of the tractor, a continuous conveyor assembly; means for movably mounting said conveyor assembly on said frame means for travel in a continuous loop including an upper flight, a lower flight, a first end adjacent said forward end of said frame means, and a second end adjacent said rearward end of said frame means; said conveyor assembly including a pair of continuous elongated conveyor chain portions, a plurality of parallel spaced pusher members attached to said conveyor portions adjacent opposite ends of said pusher members and including portions thereof substantially perpendicular to the direction of travel of said conveyor assembly and extending inwardly of said loop, a bed disposed beneath said lower flight of said conveyor assembly extending from adjacent said first end of said conveyor assembly towards said second end of said conveyor assembly, said bed including a plurality of rails spaced apart a distance less than the width of the nuts and the like to be harvested upon which the nuts and the like are adapted to be slidably supported, the end of said auger extending into said loop adjacent said first end for depositing the nuts and the like onto said bed adjacent said first end, means for driving said conveyor assembly to cause said pusher members to move along said bed from adjacent said first end towards said second end for pushing the nuts and the like along said bed towards said second end.

8. The harvester of claim 7 in which said stick separator unit comprises a cage including a plurality of spaced paddle members between which said nuts are adapted to drop, a relatively stationary shield means inside of said cage for blocking the nuts and remaining sticks from dropping therethrough, means rotatably driving said cage for causing said sticks to be carried over said cage by said paddle members, said shield extending upwardly for a distance where it terminates to permit the nuts and the like to drop through said cage while the sticks are carried over said cage, a stationary trough inside of said cage for receiving nuts and the like dropped through said cage, an auger rotatably mounted in said trough for moving the nuts and the like towards one end of the trough, a second chute attached to said one end of said trough for discharging the nuts and the like.

9. The harvester of claim 8 in which is included an upwardly opening box-like container for receiving the nuts and the like discharged from said second chute, a cradle-like frame including an upstanding front portion, an upstanding rearward portion, and a horizontal portion interconnecting said upstanding front and rearward portions, means pivotally supporting said container from said upstanding rearward portion for pivot of said container from an in-use position in which said container rests on said horizontal portion and a tilted dumping position, means interconnected between said support and said container for moving said container between said in-use and dumping positions, and means attached to said upstanding front portion for connecting said support to a three point hitch on the rearward part of a tractor which is carrying said harvester head whereby the rearward three point hitch is adapted to raise said container for the dumping of the nuts and the like therein.

10. A harvester for gathering nuts and the like from the ground comprising, a housing having bottom, front, top, back and side walls with an opening in the bottom wall and an opening in each side wall, means for moving the housing over the ground with the bottom thereof adjacent the ground, a shaft extending transverse the direction of travel of the housing, a plurality of flexible fingers of elastomeric material mounted along the shaft and extending radially therefrom to be bent rearwardly by the ground with each rotation of the shaft, means rotating the shaft to move the fingers across the ground in the direction of travel of the housing to cause the fingers to flip nuts, leaves, and other loose debris on the ground upwardly and forwardly against the front side of the housing by the straightening of the fingers when they move out of engagement with the ground, conveyor means extending transverse the direction of travel of the housing and located adjacent the front wall to catch the nuts as they fall from the front side of the housing to carry the nuts laterally out of the housing, and blower means located in the opening in one side wall of the housing to blow a stream of air laterally through the housing across the path of the nuts, leaves, and debris as they are flipped upwardly against the front wall of the housing to blow out of the opening in the other side wall at least a portion of the leaves flipped upwardly into the air stream by the fingers.

11. The harvester of claim 10 in which the conveyor means comprises a trough in the bottom wall extending between the side walls ahead of the opening in the bottom wall to catch the nuts flipped upwardly against the front wall be the fingers and an auger located in the trough to move the nuts laterally out of the housing.

References Cited

UNITED STATES PATENTS

| | | | |
|---|---|---|---|
| 2,562,775 | 7/1951 | Crull | 56—328 |
| 2,593,625 | 4/1952 | Stokes | 56—328 |
| 2,679,133 | 5/1954 | Soderholm | 56—328 |
| 2,780,904 | 2/1957 | Bowie et al. | 56—328 |
| 2,870,594 | 1/1959 | Larsh | 56—328 |
| 3,387,442 | 6/1968 | Henson | 56—328 |

RUSSELL R. KINSEY, Primary Examiner